Porter & Glines,
Provision Safe.
Nº 51,863. Patented Jan 2, 1866.
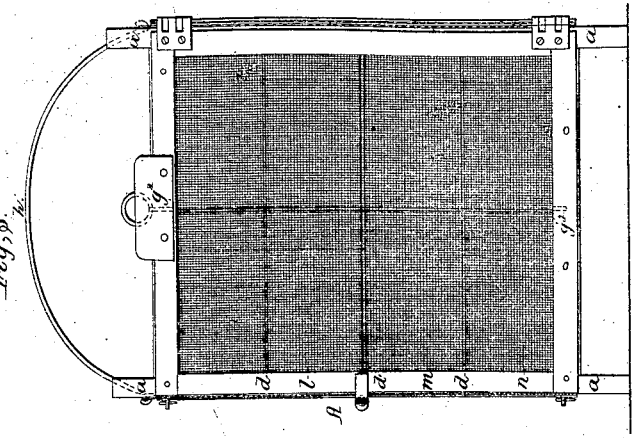
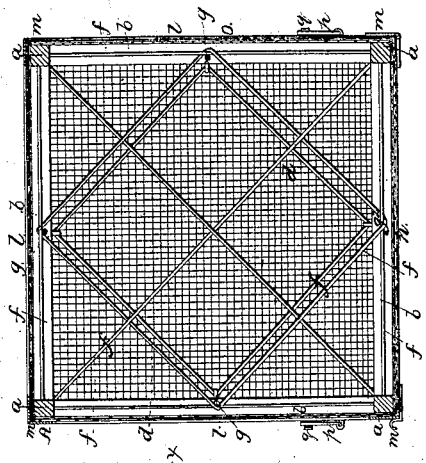
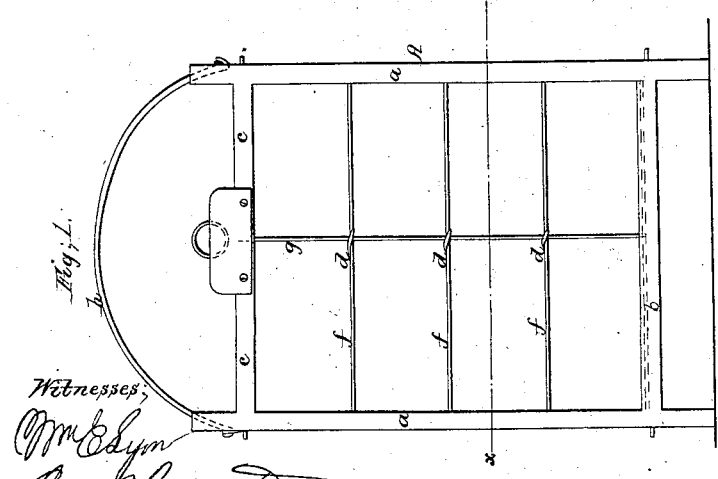

UNITED STATES PATENT OFFICE.

BENJN. F. PORTER AND H. M. GLINES, OF MANCHESTER, N. H.

TABLE-STAND FOR ARTICLES OF FOOD.

Specification forming part of Letters Patent No. 51,863, dated January 2, 1866.

*To all whom it may concern:*

Be it known that we, BENJAMIN F. PORTER and HUMPHREY M. GLINES, of Manchester, in the county of Hillsborough and State of New Hampshire, have invented a new and Improved Table-Stand for Articles of Food; and we do hereby declare that the following is a full, clear, and exact description thereof, which will enable others skilled in the art to make and use the same, reference being had to the accompanying drawings, forming part of this specification.

The present invention relates to an extremely novel and useful stand for the reception of pies, meats, and other articles of diet, in which they can be readily and conveniently carried about from place to place, as may be necessary or desired, the said stand being made of such a construction and form as to permit of its being used with propriety upon a dining-table; and, in addition to such stand, in order to protect the articles placed in or on it from bugs, flies, and other insects, I entirely surround or incase it with and by a suitable-shaped wire-gauze frame so constructed and arranged as to enable the articles to be readily removed from or placed upon the stand, as may be desired, this wire-gauze covering being susceptible of detachment at pleasure.

Having thus stated the general features and objects of the present invention, we will now proceed to describe the same in detail, reference being had to the accompanying plate of drawings, of which—

Figure 1 is a side elevation of the table-stand; Fig. 2, a transverse horizontal section taken in the plane of the line $x\ x$, Fig. 1, and Fig. 3 a side elevation of the stand with a wire-gauze covering or casing applied to it.

A A in the drawings represent the frame of the stand, made of a square shape, consisting of four upright corner pieces or posts, $a\ a\ a\ a$, connected by cross-bars $b\ b\ b\ b$ at a short but an equal distance from the lower ends of each post $a$, forming legs thereof, which bars $b$ are all in the same horizontal plane.

$c\ c\ c\ c$ are a series of connecting or cross bars for the several posts $a\ a\ a\ a$, at or near their upper ends, all arranged in the same plane.

$d\ d\ d$ are a series of horizontal shelves arranged in the space inclosed by the said posts $a$, in and to which their corners are secured in any proper manner. These shelves are formed of light but strong wires $f\ f\ f$, passing across and intersecting each other, and from one post to another, in such a manner as to produce shelves of sufficient rigidity that they will not sag from the weight of any of the articles which it is intended to place upon them.

$g\ g\ g^2$ are a series of fixed vertical rods placed midway between the several posts, to which rods the wires of the shelves are also secured, forming an additional support thereto, one of which rods, $g^2$, however, in lieu of being fixed, is made removable, so as to allow articles of equal dimensions to the space between the posts to be placed upon the shelves.

$h$ is a bail-handle hung to the upper cross-bars of the frame A, by which it can be conveniently carried, when so desired, from place to place. In this frame, and upon the several shelves composing the same, it is intended to place pies, meats, and other articles of food, where, as is obvious, they can be kept, so that, when wanted, by setting the stand upon the dining-table they are convenient for removal at pleasure.

When desired, as is necessary during the warm season especially, that the pies, meats, &c., contained in the stand should be protected from flies, insects, &c, and yet a circulation of air admitted through the stand, we attach to and completely surround the stand upon its sides, top, and bottom with a closed wire-netting, $l$, one end of which should be so arranged as to be opened and closed at pleasure, in order to permit the articles to be inserted in and removed from the stand; and to render such wire-gauze susceptible of removal, so that when not necessary or wanted it can be detached from the stand, in lieu of fixing it directly to the stand, we secure it to a suitable frame, $m$, bent or made into corresponding shape to that of the periphery of the stand, one side, $n$, of which is hinged to the remaining portion forming a door, which can be opened and closed at pleasure, the other sides, $o$, of the said frame being secured to the stand by swinging hooks $p$ and boxed staples $q$ thereof, as plainly shown in the drawings.

We claim as new and desire to secure by Letters Patent—

The table-stand provided with a series of shelves, and either with or without an open wire netting or casing, substantially as described, and for the reception of articles of diet, as specified.

BENJAMIN F. PORTER.
HUMPHREY M. GLINES.

Witnesses:
JOSEPH ROWLEY
J. Q. A. EAGER.